United States Patent Office 3,708,560
Patented Jan. 2, 1973

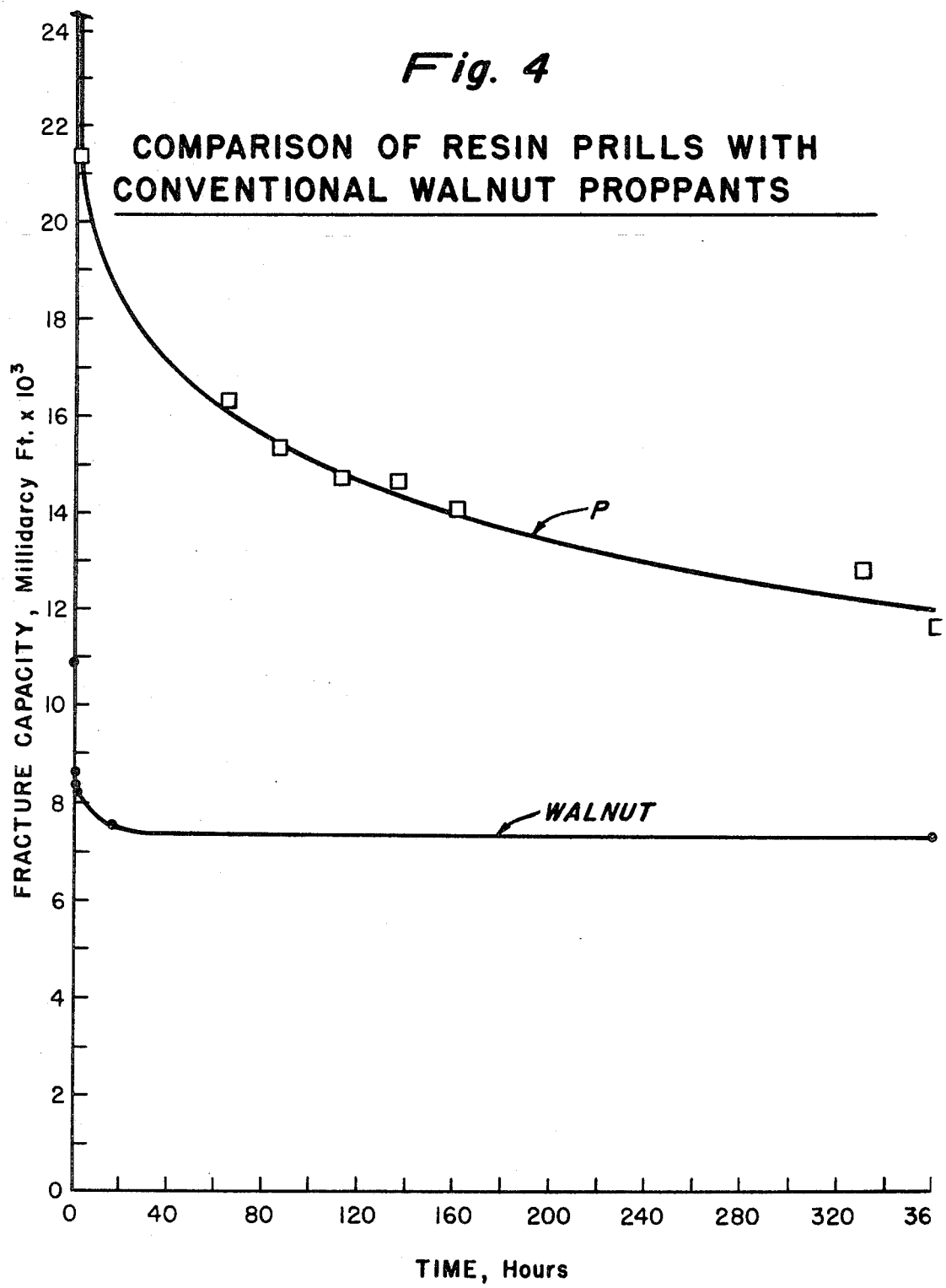

3,708,560
HYDRAULIC FRACTURING PROPPANT COMPOSITION AND METHOD FOR FORMING SUCH PROPPANTS
James F. Mayer, Hinsdale, and Robert G. Weisz, Oswego, Ill., assignors to Standard Oil Company, Chicago, Ill.
Continuation of abandoned application Ser. No. 857,880, Sept. 15, 1969. This application July 12, 1971, Ser. No. 161,981
Int. Cl. C08f 21/02, 47/02; B29c 23/00
U.S. Cl. 264—13     10 Claims

ABSTRACT OF THE DISCLOSURE

A two-component catalyst system for curing unsaturated polyester resin prills useful as proppants in hydraulic fracturing, the prills being the reaction product of (1) the condensation reaction product of (a) an unsaturated dicarboxylic acid containing from 4 to 8 carbon atoms of the group consisting of alkenedioic acids and anhydrides thereof, (b) a benzene dicarboxylic acid of the group consisting of isophthalic acid, terephthalic acid, alkyl substituted isophthalic acid, alkyl substituted terephthalic acid and mixtures thereof, where each of said alkyl substituted acids contains from 1 to 3 alkyl groups and each alkyl group contains from 1 to 4 carbon atoms and (c) an oxyalkanediol containing from 4 to 12 carbon atoms and (2) a monomer selected from the group consisting of ethylenic and allylic monomers; and a process for forming such prills. In the preferred embodiment, the reactants forming the condensation reaction product (1) also include a minor proportion of an alkanediol containing from 2 to 12 carbon atoms.

RELATED APPLICATION

James F. Mayer and Robert G. Weisz application entitled "Hydraulic Fracturing Proppant and Process for Preparation," Ser. No. 857,880, filed Sept. 15, 1969 and now abandoned.

The present application is a continuation-in-part of Ser. No. 857,880.

This invention relates to the hydraulic fracturing of underground formations to increase the productivity of an oil or gas well and, more particularly, to improved proppants for maintaining the fractures in an open position and to a method for preparing the proppants.

In increasing the productivity of oil and gas wells, various methods have been employed to increase the drainage area within a selected producing zone. One of these methods is described in United States Pat. No. 2,596,844 to Clark, involves forming permeable channels in a deep earth formation adjacent a well by the application of hydrostatic pressure. To produce fractures to form these channels, a low penetrating liquid as defined in the aforementioned patent is placed in the well opposite the zone to be fractured. Pressure is then applied to the liquid; and, because of its decreased tendency to filter through the formation, a pressure is built up in the well that is sufficient to produce fractures. After removal of the liquid, the fractures serve as channels for the oil or gas so that they may be more readily removed from the formation.

So that the channels do not close when the hydraulic pressure is removed, it has been found advantageous to place something in these channels to "prop" them open. Various materials, termed "proppants," have been used. Sand, rounded walnut shells, glass beads and aluminum spheres have all been used.

Sand is desirably used because it is relatively inexpensive. However, it can only be employed in applications where the wells are shallow because of the inability of sand to withstand the pressures that tend to close the channels in deep wells.

From the standpoint of accepting considerable pressure, rounded walnut shells have been found to be superior to sand but are still unable to successfully serve as a proppant for deeper wells. Also, a ready and continuous supply of walnut shells is not always available. And the irregular shape of the "rounded" walnut shells tends to provide erratic performance as well as creating potential plugging problems.

An object of the present invention is to provide hydraulic fracturing proppants, and methods of preparation therefor, that are characterized by sufficient compressive toughness at high temperatures to withstand the pressures associated with deep wells while at the same time retaining flexibility and freedom from brittleness under the conditions of use.

Another object includes the provision of a hydraulic fracturing proppants and methods for preparation therefor that form proppants of uniform configuration. In this connection, a related object is to provide proppants that are substantially spherical in shape.

A further object of the invention provides hydraulic fracturing proppants that have superior oil and water resistance.

A still further object of the present invention is to provide hydraulic fracturing proppants that may be tailored to yield the various physical and chemical properties that are both desired and required for varying end uses.

Other objects and advantages of the invention will become apparent as the following description proceeds, taken in conjunction with the accompanying drawings in which:

FIG. 4 is a graph comparing the hydraulic fracturing proppants of this invention with conventionally used walnut shells.

Figure 1:
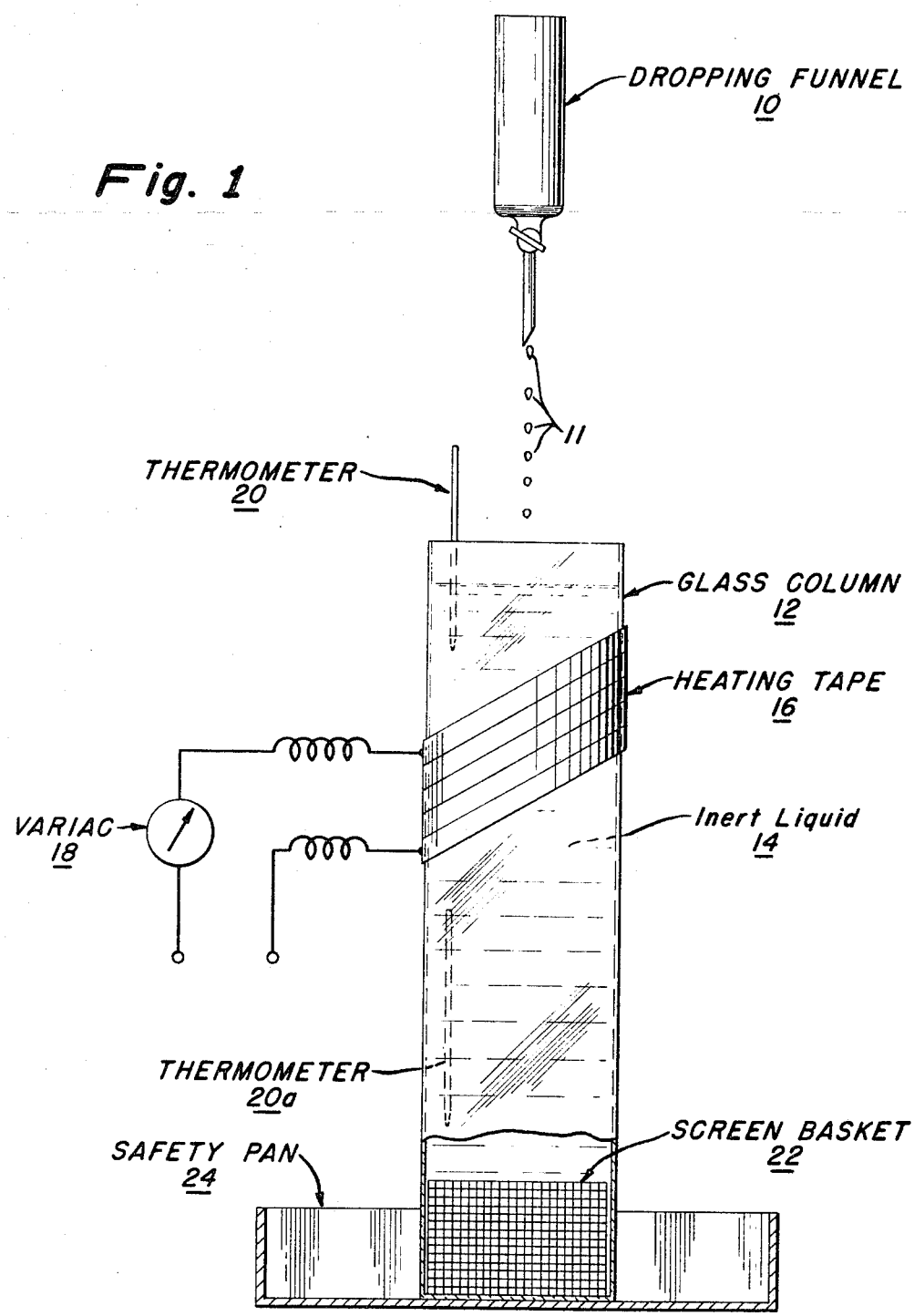
FIG. 1 is a schematic view illustrating one type of apparatus that is suitable for carrying out the novel method for forming the hydraulic fracturing proppants of this invention.

While the invention is susceptible of various modifications and alternative forms, specific embodiments thereof have been shown by way of example and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

In accordance with the present invention, there are provided compositions suitable for forming hydraulic fracturing proppants of unsaturated polyester resin prills. Thus, there is provided a two component curing catalyst system for such resin prills wherein one component is active at just above room temperature (i.e. −60° F. to 100° F.) and the other is active at about 220° F. The resin prills (i.e., substantially spherical in configuration) are the reaction product of (1) the condensation reaction product of (a) from about 3 to 6 moles of an unsaturated dicarboxylic acid containing from 4 to 8 carbon atoms of the group consisting of alkenedioic acids and anhydrides thereof, (b) about 3 moles of a benzene dicarboxylic acid of the group consisting of isophthalic acid, terephthalic acid, alkyl substituted isophthalic acid, alkyl substituted terephthalic acid and mixtures thereof, where each of the alkyl substituted acids contains from 1 to 3 alkyl groups and each alkyl group contains from 1 to 4 carbon atoms and (c) from about 6 to about 9 moles of an oxyalkanediol containing from 4 to 12 carbon atoms and (2) from about 20% to about 60% by weight based upon the total weight of the reactants of a monomer selected from the group consisting of ethylenic and allylic monomers. In the preferred embodiment, the reactants forming the condensation reaction product (1) also include up to about 25 mole percent, preferably 5 to 15%, of an alkanediol containing from 2 to 12 carbon atoms, the alkanediol replacing a like amount of the oxyalkanediol. The total number of moles of the oxyalkanediol and the alkanediol that are employed should be substantially identical to the total number of moles of components (a) and (b) used. The oxyalkanediol that is present preferably corresponds to the alkanediol; thus, when diethylene glycol is used, ethylene glycol is desirably employed.

In a preferred embodiment, the unsaturated dicarboxylic acid is fumaric acid, the benzene dicarboxylic acid is isophthalic acid, the oxyalkanediol is diethylene glycol and the monomer is styrene. The components are present in the following amounts: (a) fumaric acid, 5 moles, (b) isophthalic acid, 3 moles, (c) diethylene glycol, 8.0 moles, (d) ethylene glycol, 0.8 mole and (e) styrene, 42% by weight based upon the total weight of the finished resin.

Regarding the reactants utilized in the preparation of the unsaturated polyester resins of this invention the unsaturated dicarboxylic acids utilized are alkenedioic acids and anhydrides thereof, which contain 4–8 carbon atoms. Illustrative of these unsaturated dicarboxylic acids are fumaric acid, maleic acid, maleic anhydride, allylmalonic acid, allylmalonic anhydride, isopropylidene malonic acid, isopropylidene malonic anhydride, itaconic acid, itaconic anhydride, citracone acid, citraconic anhydride, mesaconic acid, glutaconic acid, glutaconic anhydride, dimethylitaconic acid, methylene glutaric acid, allyl succinic acid, trimethyl glutaconic acid, and diethyl maleic acid. Fumaric acid and maleic anhydride are particularly suitable.

The benzene dicarboxylic acid may be isophthalic acid itself, terephthalic acid itself, or mixtures of these two. In addition to the defined acids themselves, alkyl substituted isophthalic acid and terephthalic acid may be used. The substituted acids contain one, two, or three alkyl groups and each alkyl group contains 1 to 4 carbon atoms. Illustrative of the substituted acids are methyl isophthalic acid, isopropyl isophthalic acid, t-butyl isophthalic acid, diethyl isophthalic acid, and methyl terephthalic acid.

The oxyalkanediols contain from 4 to 12 carbon atoms, with the diols containing from 4 to 6 carbon atoms being preferred. Illustrative examples include diethylene glycol, triethylene glycol, tetraethylene glycol, dipropylene glycol, and tripropylene glycol.

The alkanediols contain from 2 to 12 carbon atoms. Representative examples include ethylene glycol, propylene glycol, 1,3-butanediol, 1,4-butanediol, neopentyl glycol, 1,6-hexanediol, 1,8-octanediol and 1,10-decanediol.

The ethylenic or allylic monomers, used as a cross-linking agent, is intended to include styrene itself, alpha methyl styrene, the various methyl styrenes, divinyl benzene, trivinyl benzene, ethyl styrene, and diethyl styrene; or any type of acrylic or methacrylic monomer; or allylic monomer such as diallylphthalate, diallylisophthalate or triallylcyanurate.

Another feature of this invention provides a novel method for forming the prills. The condensation reaction product is first formed and the cross-linking monomer added. It should be appreciated that the resulting resin solution need not be directly formed into a prill but may be stored until it is desired to actually form the prills. At this point, the resin solution and the two component curing catalyst system of the present invention are added to a vessel such as a funnel. The resulting resin solution is then released dropwise through an inert hot liquid. The liquid should be maintained at a temperature that allows the prills to be cured by the catalyst system as they fall through the liquid. Also, the liquid should have specific gravity characteristics that will allow the polyester prills being formed to flow by gravity down through the liquid at a predetermined control rate. The formed polyester prills are then collected after having passed through a zone of sufficient length to effect a cure. The cured polyester prills are then generally separated from the hot inert liquid, washed and dried. The drying operation may serve as a post cure if desired.

Discussing the process in greater detail, the polyester condensation reaction is first carried out by any suitable method. For example, the conventional two-stage method of processing may be employed. The benzene dicarboxylic acid and the dihydric alcohols are first reacted together to an acid number, generally less than 5, and the unsaturated dicarboxylic acid is then added. The resin is cooked to reach the desired molecular weight as evidenced by the acid number-viscosity relationship. At this stage, and following cooling, the cross-linking monomer may be added. As previously pointed out, the resin solution may be directly charged and the prill formed or may be stored, as desired. When the prills are to be formed, the resin solution and curing catalyst system are then brought together.

The particular temperature of the inert liquid and the distance through which the prills fall before cure has been effected will of course depend upon the viscosity of the liquid and the curing catalyst system employed. These variables may be coordinated together to provide the particular temperature of the liquid, distance through which the prills fall, viscosity of the liquid and the curing catalyst system that are desired.

In accordance with the present invention, use of the two component catalyst system results in the prill cure being initiated when the prill first contacts the inert liquid due to the action of the component active at about 60° F. to 100° F. This effects a skin which seals the sphere and prevents monomer from leaching into the inert liquid. As the prill passes downwardly through the liquid, its temperature increases and the higher temperature catalyst then becomes effective to complete the cure. It should be appreciated that the addition of the curing catalyst system should be carefully timed to avoid any significant curing of the resin before it is dropwise released to form the prills themselves. It is preferred to use a system including, based upon the weight of the resin solution, from about ⅛ to 2 percent, methyl ethyl ketone peroxide (effective at room temperature), about ½ percent being particularly preferred, and from about ¼ to about 2 percent benzoyl peroxide (effective at 180° F. to 250° F.), about 1 percent being particularly preferred.

While the above system may be preferred, it should be understood that the two component curing system of the present invention may be formulated by an appropriate selection from any of the types of organic peroxides conventionally used as polymerization initiators, the relative amounts being the same as set forth for the two components of the preferred embodiment. Thus, hydroperoxides (R—O—O—H), alkyl peroxides (R—O—O—R'), peroxy acids

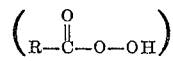

diacyl peroxides

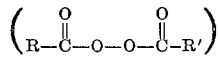

and peroxy esters

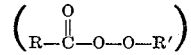

may all be advantageously employed. More specifically, to serve as the low temperature component which is active at room temperature or slightly higher, suitable peroxides should have an activation energy (DE) of less than about 30.0 kcal./mole; and representative examples include pinane hydroperoxide and 2,4-dichlorobenzoyl peroxide. Suitable high-temperature component peroxides should have an activation energy of about 30.0 kcal./mole or more; and useful examples include t-butyl peroxide, t-butyl perbenzoate and lauroyl peroxide.

The liquid through which the forming prills fall should be inert with respect to the resin components and should not leach the styrene from the resin solution. Particularly suitable are polyolefins with a molecular weight of 670 to 2060, a viscosity at 210° F. of 250 to 14,870 SSU and specific gravities of from 0.869 to 0.904. It is preferred to employ polybutenes having a molecular weight in the range of about 670 to about 850, viscosities at 210° F. of from about 250 to about 550 SSU and specific gravities of from 0.869 to 0.878. Polybutenes and polypropylenes are preferred because of their superior stability under the process conditions and the relative ease with which the desired specific gravity may be achieved.

Turning to FIG. 1, there is shown one embodiment of the invention whereby the novel method of the present invention may be carried out. To this end, the resin solution is placed in a dropping funnel 10 and the curing catalyst system added. The funnel periodically supplies drops 11 of the catalyzed resin solution to a glass column 12 containing a hot inert liquid 14. By means of heating tape 16 connected to the heating coils 18, the temperature of the liquid 14 is maintained at a temperature sufficient to activate the high temperature component of the curing catalyst system used, generally from about 220° F. to about 250° F. Thermometers 20 are placed in the fluid to insure maintenance of the proper temperature.

The polyester prills 11 are cured as they fall by gravity through the inert liquid 14 and are collected in a screen basket 22 located in the bottom of the glass column 12. The column 12 should have a sufficient length so that the prills are adequately cured by the time they fall into the basket 22. The glass column 12 can be positioned, if desired, within a safety pan 24 to catch any resin 11 that does not drop into the glass column 12.

Figure 2:
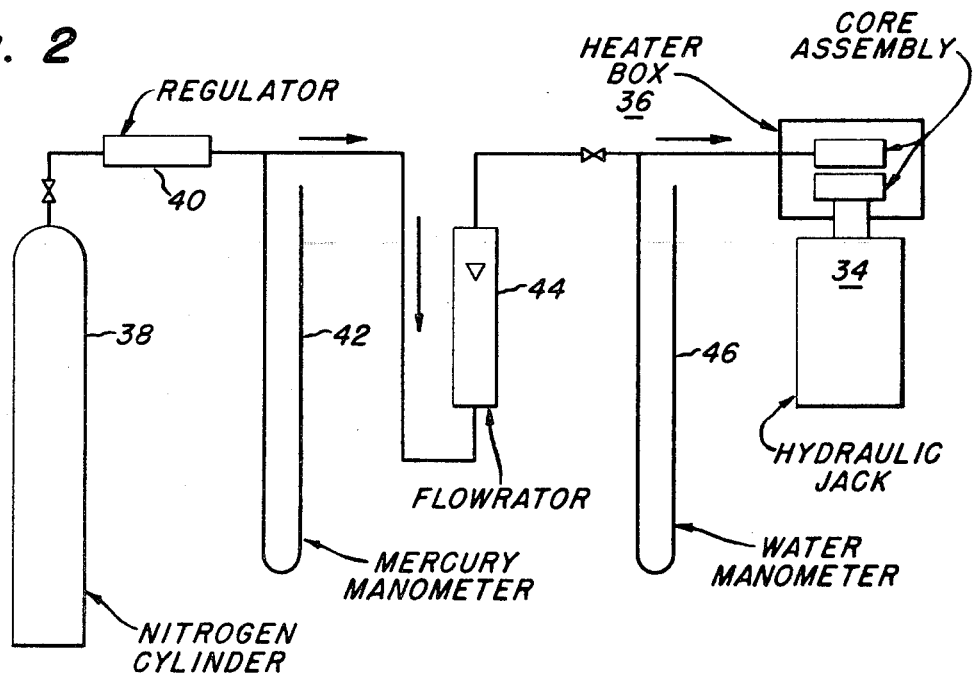
FIG. 2 is a schematic view showing test apparatus for carrying out a fracture capacity test.
Figure 3:
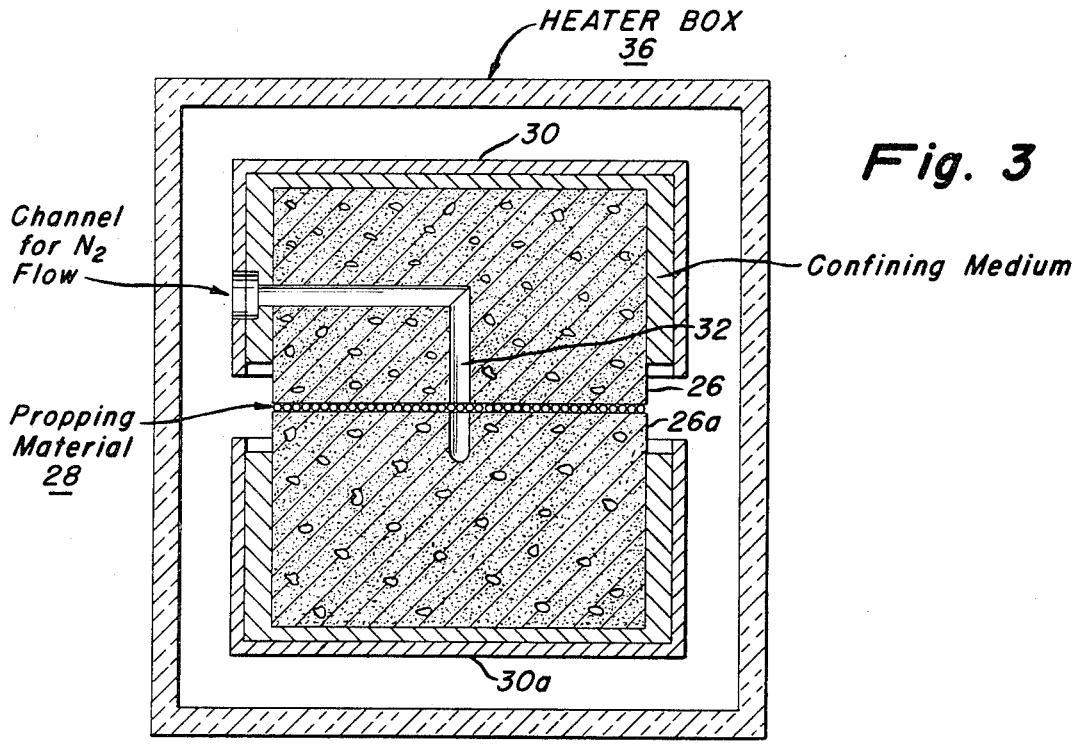
FIG. 3 is a cross-sectional view of the heater box and wire assembly shown in FIG. 2.

FIGS. 2 and 3 illustrate a schematic view of a laboratory test apparatus for determining the fracture flow capacity of a propping material. The propping material to be tested is placed between field core sections 26 (i.e., composed of an underground formation (that have a diameter of 3½ inches and are two inches in length. Arrow 28 indicates the positioning of the propping material. These sections are mounted in steel cups 30 with a controlled melting point alloy to confine the core so that about ¼ inch of the smooth core faces protrude above the top edge of the cup 30. A ³⁄₁₆ diameter hole, indicated at 32, is drilled in the upper core half from the center of the core to the outside circumferential surface and may be provided with tubing. The overburden pressure, characteristic of a particular underground depth, is placed upon the two core sections 26, with the propping material in place, by means of a hydraulic jack 34. Simulation of the process temperature conditions is achieved by placing the core halves 26 into a heater box 36.

The fracture flow capacity, in terms of permeability, is determined by flowing nitrogen gas from a cylinder 38 through a regulator 40, into the hole 32 and through the simulated fracture between the two core halves 26 containing the propping material. The nitrogen flow is measured by a mercury manometer 42, a flowrator 44 and a water manometer 46, as is conventionally known.

For short term tests the propping material is physically placed on the core face in a partial monolayer (i.e., the propping material is placed in a single layer over a portion of the surface; in practice, the remainder of the layer is generally filled with a spacer resin that dissolves in the oil flowing to the well bore. This allows the proppants to be widely spaced across the fracture). The proppants are then subjected to selected increments of overburden pressure at room temperature with a nitrogen flow measurement taken after each overburden increment. This type of test is generally completed within a few hours. To study the effect of time and temperature, the propping material is placed under the desired overburden load and maintained at an elevated temperature for a period of 30 days. Nitrogen flow ratings are taken at certain intervals, such as one per week, to measure the change in fracture capacity.

The hereinbefore described method of forming proppants and the resulting proppants may be readily understood from the following examples, which are illustrative of how the present invention could be carried out. The examples are not intended as limiting the scope of the invention.

EXAMPLE 1

The following reactants are charged to a standard two-liter kettle equipped with a sparge tube and mantle heating:

| Reactant | Grams | Moles |
| --- | --- | --- |
| Isophthalic acid | 249 | 1.5 |
| Diethylene glycol | 424 | 4.0 |
| Ethylene glycol | 25 | 0.4 |

The sparge rate is set at 0.040 cubic feet per minute per two liter charge. The temperature is rapidly brought up to 400° F. Distillate begins to come over almost immediately. After one hour, 54 grams of water has been distilled. The reaction gradually increases the temperature of the charge until the kettle temperature after two hours has increased to 445° F. During the esterification, the temperature is controlled at 445° to 460° F.

After 5¾ hours of reaction time, the acid number of the reaction mixture is 9.1. At this point, 290 grams (2.5 moles) of fumaric acid and the remainder of the ethylene glycol are charged. The esterification is continued at, essentially, 450° F. for an additional 6½ hours. At this time, the acid number is 16.7 and has a final viscosity of Z–2 plus (Gardner-Holdt) (e.g., about 3600 centipoises).

The reaction is then discontinued and 0.27 gram of an inhibitor, hydroquinone, and 583 grams of monomeric styrene are added to provide a resin solution having a viscosity (cps.) of 870.

The resin solution is placed in a separatory funnel; and, based upon the weight of the resin solution, about 1 percent benzoyl peroxide and ½ percent methyl ethyl ketone peroxide are added. Prills are formed by employing the apparatus of FIG. 1.

The resin solution is thus dropwise released from a separatory funnel into a polybutene having a molecular weight of about 770, a viscosity at 210° F. of 540 SSU and a specific gravity of 0.878. The polybutene is contained in a 4 inch diameter glass column approximately 36 inches high. The column is heated with electrical strip heaters which maintain the column temperature at about 220° F.

The hardened spheres are collected at the bottom of the column in a wire basket. Upon removal from the column the hardened prills are solvent washed in toluene and then screened according to mesh size.

The resulting prills are tested by using the apparatus of FIGS. 2 and 3 to carry out short term tests as hereinbefore described. The proppants are placed in the apparatus in a ¼ monolayer and the field core sections are limestone (Grayburg formation) from Hobbs Field, N.M.

The overburden pressure is set at 4980, 6640, 8300 and 9960 p.s.i. to, respectively, correspond to depths of 7,100 feet, 9,500 feet, 11,600 feet and 13,750 feet. Walnut shells are tested under the same conditions and the fracture flow capacity results in millidarcy-feet are shown in Table 1:

TABLE 1

| Equivalent depth, ft | 7,100 | 9,500 | 11,600 | 13,750 |
|---|---|---|---|---|
| Sample: | | | | |
| 8–12 mesh: | | | | |
| Polyester prills | 24,000 | 16,000 | 13,000 | |
| Walnut shells | 33,300 | 25,400 | 17,200 | 5,500 |
| 12–20 mesh: | | | | |
| Polyester prills | 13,000 | 10,000 | 7,000 | |
| Walnut shells | 15,900 | 12,000 | 8,400 | |

Long term fracture capacity tests using the apparatus of FIGS. 2 and 3 are conducted on the polyester resin prills according to the procedure hereinbefore described. The formation used for the field core sections is the same as for the short term test. The prills are placed in a ¼ monolayer and the pressure is set at about 4910 p.s.i. to correspond to a depth of 7,000 feet. The temperature is maintained at about 150° F. Walnut shells are tested using the same procedure. The results are shown in FIG. 4.

As can be seen, while the short term flow capacities of the polyester prills are only comparable to those of the walnut shells, the polyester prills of the present invention provide greater permeability than do the conventionally used walnut shells in the long term fracture capacity tests which more closely approximate the conditions that exist in actual use.

EXAMPLE 2

Example 1 is repeated except no ethylene glycol is added, maleic anhydride is substituted for the fumaric acid and the condensation reactants are present in the following molar amounts:

Reactant: Moles
Isophthalic acid _____ 1.5
Maleic anhydride _____ 2.5
Diethylene glycol _____ 4.0

The prills which are formed are tested and similar results are achieved.

EXAMPLE 3

Example 1 is repeated except trimethyl glutaconic acid is substituted for the fumaric acid and the condensation reactants are present in the following molar amounts:

Reactant: Moles
Isophthalic acid _____ 1
Trimethyl glutaconic acid _____ 1
Diethylene glycol _____ 2
Ethylene glycol _____ 0.15

The prills which are formed are tested and similar results are achieved.

EXAMPLE 4

Example 1 is repeated except 579 grams of diallylphthalate are substituted for the styrene. The prills which are formed are tested and similar results are achieved.

EXAMPLE 5

Example 1 is repeated except methyl terephthalic acid is substituted for the isophthalic acid. The formed prills are tested and similar results are achieved.

EXAMPLE 6

Example 1 is repeated except diethyl isophthalic acid is substituted for the isophthalic acid. The formed prills are tested and similar results are achieved.

EXAMPLE 7

Example 1 is repeated except tripropylene glycol is substituted for the diethylene glycol. The formed prills are tested and similar results are achieved.

EXAMPLE 8

Example 1 is repeated except 1, 10-decanediol is substituted for the ethylene glycol. The formed prills are tested and similar results are achieved.

Thus, as has been seen, the present invention provides useful compositions for forming hydraulic fracturing proppants of unsaturated polyester resin prills that have superior compressive toughness at the temperatures normally employed in hydraulic fracturing yet retaining freedom from fragility and brittleness. In addition, one of the features of this invention provides a method of forming polyester prills of relative uniformity in configuration and in such a manner as to minimize leaching of the monomer from the resin during curing.

We claim as our invention:

1. In a composition suitable for the preparation of polyester resin prills comprising
    (I) the reaction product of
        (1) the condensation reaction product of
            (a) from about 3 to about 6 moles of an unsaturated dicarboxylic acid containing from 4 to 8 carbon atoms of the group consisting of alkenedioic acids and anhydrides thereof,
            (b) about 3 moles of a benzene dicarboxylic acid of the group consisting of isophthalic acid, terephthalic acid, alkyl substituted isophthalic acid, alkyl substituted terephthalic acid and mixtures thereof, where each of the alkyl substituted acids contains from 1 to 3 carbon atoms and each alkyl group contains from 1 to 4 carbon atoms and
            (c) from about 6 to about 9 moles of an oxyalkanediol containing from 4 to 12 carbon atoms, the number of moles of said oxyalkanediol being substantially equal to the total number of moles present of the unsaturated dicarboxylic acid and the benzene dicarboxylic acid, and
        (2) from about 20 percent to about 60 percent, based upon the total weight of condensation reaction product (1), of an ethylenic monomer and
    (II) a curing catalyst; the improvement wherein the curing catalyst comprises a two component organic peroxide catalyst system, one component thereof being active at a temperature in the range of about 60° F. to 100° F. and the other component being active in the temperature range of about 220° F.– 250° F.

2. The resin prill of claim 1 wherein the reactants forming the condensation reaction product include up to about 25 mole percent of an alkanediol containing from 2 to 12 carbon atoms, the alkanediol replacing a like amount of the oxyalkanediol.

3. The resin prill of claim 1 wherein the reactants forming the condensation reaction product include up to about 25 mole percent of an alkanediol containing from 2 to 12 carbon atoms, the alkanediol replacing a like amount of the oxyalkanediol.

4. The unsaturated polyester resin prill of claim 1 wherein said unsaturated dicarboxylic acid is fumaric acid.

5. The unsaturated polyester resin prill of claim 1 wherein said unsaturated dicarboxylic acid is maleic anhydride.

6. In a composition suitable for the preparation of polyester resin prills comprising
    (I) the reaction product of
        (1) the condensation reaction product of
            (a) from about 3 to about 6 moles of an unsaturated dicarboxylic acid containing from 4 to 8 carbon atoms of the group consisting of alkenedioic acids and anhydrides thereof,
            (b) about 3 moles of a benzene dicarboxylic acid of the group consisting of isophthalic acid, terephthalic acid, alkyl substituted isophthalic acid, alkyl substituted terephthalic acid and mixtures thereof, where each of the alkyl substituted acids contains from 1 to 3 carbon atoms and each alkyl group contains from 1 to 4 carbon atoms and (c) from about 6 to about 9 moles of an oxyalkanediol containing from 4 to 12 carbon atoms, the number of moles of said oxyalkanediol being substantially equal to the total number of moles present of the unsaturated dicarboxylic acid and the benzene dicarboxylic acid, and (2) from about 20 percent to about 60 percent, based upon the total weight of condensation reaction product (1), of an ethylenic monomer and (II) a curing catalyst; the improvement wherein the curing catalyst comprises a two component organic peroxide catalyst system, comprising, based on the weight of (I), from about ⅛ to about 2% methyl ethyl ketone peroxide and from about ¼ to about 2% benzoyl peroxide.

7. In a method of forming an unsaturated polyester resin prill comprising (I) forming the condensation reaction product of (a) from about 3 to about 6 moles of an unsaturated dicarboxylic acid containing from 4 to 8 carbon atoms of the group consisting of alkenedioic acids and anhydrides thereof, (b) about 3 moles of a benzene dicarboxylic acid of the group consisting of isophthalic acid, terephthalic acid, alkyl substituted isophthalic acid, alkyl substituted terephthalic acid and mixtures thereof, where each of the alkyl substituted acids contains from 1 to 3 carbon atoms and each alkyl group contains from 1 to 4 carbon atoms and (c) from about 6 to about 9 moles of an oxyalkanediol containing from 4 to 12 carbon atoms, the number of moles of said oxyalkanediol being substantially equal to the total number of moles present of the unsaturated dicarboxylic acid and the benzene dicarboxylic acid, (II) forming a resin solution by adding to the condensation reaction product (1) from about 20 percent to about 60 percent, based upon the total weight of the resin solution, of an ethylenic monomer and (2) a curing catalyst, (III) releasing the thus-formed resin solution, before any significant curing has taken place, in a dropwise fashion into an inert, hot liquid maintained at a temperature which activates the curing catalyst, and (IV) allowing the drops to pass through the inert, hot liquid to effect cure; the improvement wherein the curing catalyst comprises a two component organic peroxide catalyst system, one component thereof being active at a temperature in the range of from about 60° F. to 100° F. in order to initially form a skin on the drops and the other component being active at temperatures of 180° F. or higher.

8. The method of claim 7 wherein said curing catalyst system comprises from about ⅛ to about 2% methyl ethyl ketone peroxide and from about ¼ to about 2% benzoyl peroxide, based upon the weight of the resin solution.

9. The method of claim 7 wherein said hot liquid is a polyolefin having a molecular weight of from about 670 to about 2060.

10. In a composition suitable for the preparation of polyester resin prills comprising (I) the reaction product of (1) the condensation reaction product of (a) from about 3 to about 6 moles of an unsaturated dicarboxylic acid containing from 4 to 8 carbon atoms of the group consisting of alkenedioic acids and anhydrides thereof, (b) about 3 moles of a benzene dicarboxylic acid of the group consisting of isophthalic acid, terephthalic acid, alkyl substituted isophthalic acid, alkyl substituted terephthalic acid and mixtures thereof, where each of the alkyl substituted acids contains from 1 to 3 carbon atoms and each alkyl group contains from 1 to 4 carbon atoms and (5) from about 6 to about 9 moles of an oxyalkanediol containing from 4 to 12 carbon atoms, the number of moles of said oxyalkanediol being substantially equal to the total number of moles present of the unsaturated dicarboxylic acid and the benzene dicarboxylic acid, and (2) from about 20 percent to about 60 percent, based upon the total weight of condensation reaction product (1), of an ethylenic monomer and (II) a curing catalyst; the improvement wherein the curing catalyst comprises a two component organic peroxide catalyst system, one component thereof having an activation energy of less than 30.0 kcal./mole and the other component having an activation energy of at least about 30.0 kcal./mole.

References Cited

UNITED STATES PATENTS

| | | | |
|---|---|---|---|
| 2,632,753 | 3/1953 | Anderson | 260—45.4 |
| 3,210,443 | 10/1965 | Reddie et al. | 264—14 |
| 3,436,365 | 4/1969 | Weber et al. | 260—33.6 |
| 3,462,514 | 8/1969 | Kurkowski et al. | 260—861 |

OTHER REFERENCES

Lawrence, "Polyester Resins," pp. 96–97, Reinhold Publishing, 1960.

WILLIAM H. SHORT, Primary Examiner

E. A. NIELSEN, Assistant Examiner

U.S. Cl. X.R.

166—280; 252—8.55 R; 260—861